United States Patent
Bhutiani

(10) Patent No.: US 7,359,725 B2
(45) Date of Patent: Apr. 15, 2008

(54) PUSH-TO-TALK APPARATUS AND METHOD FOR COMMUNICATION BETWEEN AN APPLICATION SERVER AND MEDIA RESOURCE FUNCTION PROCESSOR

(76) Inventor: Gurvesh Bhutiani, 755 E. Capitol Ave. Apt. G207, Milpitas, CA (US) 95035

( * ) Notice: Subject to any disclaimer, the term of this patent is extended or adjusted under 35 U.S.C. 154(b) by 0 days.

(21) Appl. No.: 11/283,131

(22) Filed: Nov. 18, 2005

(65) Prior Publication Data

US 2006/0116150 A1    Jun. 1, 2006

Related U.S. Application Data

(60) Provisional application No. 60/630,995, filed on Nov. 24, 2004.

(51) Int. Cl.
*H04B 7/00* (2006.01)
*H04Q 7/20* (2006.01)

(52) U.S. Cl. ........................ 455/518; 455/520

(58) Field of Classification Search ......... 455/517–521
See application file for complete search history.

(56) References Cited

U.S. PATENT DOCUMENTS 6,738,617 B2 * 5/2004 Rosen et al. ................. 455/418

* cited by examiner

*Primary Examiner*—Philip J. Sobutka

(57) ABSTRACT

An exemplary embodiment of an apparatus for performing push-to-talk communications over a wireless network comprises a push-to-talk (PTT) server including an application server (AS) and a media resource function processor (MRFP) configured to communicate with user equipment over a wireless link. The application server includes a media resource function controller (MRFC), and the MRFP is configured to provide floor control in a push-to-talk session. In one aspect of the invention, a plurality of handsets if provided where each handset is capable of communicating with an application server and each handset includes a floor request switch configured to selectively generate a floor request signal. The MFRP is configured to receive a floor request signal and to selectively grant floor control to a requesting user. Advantages of the invention include an efficient technique for providing push-to-talk communications.

20 Claims, 15 Drawing Sheets

(6.1.2)

(6.2)

(6.3)

(6.4)

(6.5)

(6.6)

(6.6.1)

(6.7.1)

(6.7.2)

(6.7.3)

(6.7.4)

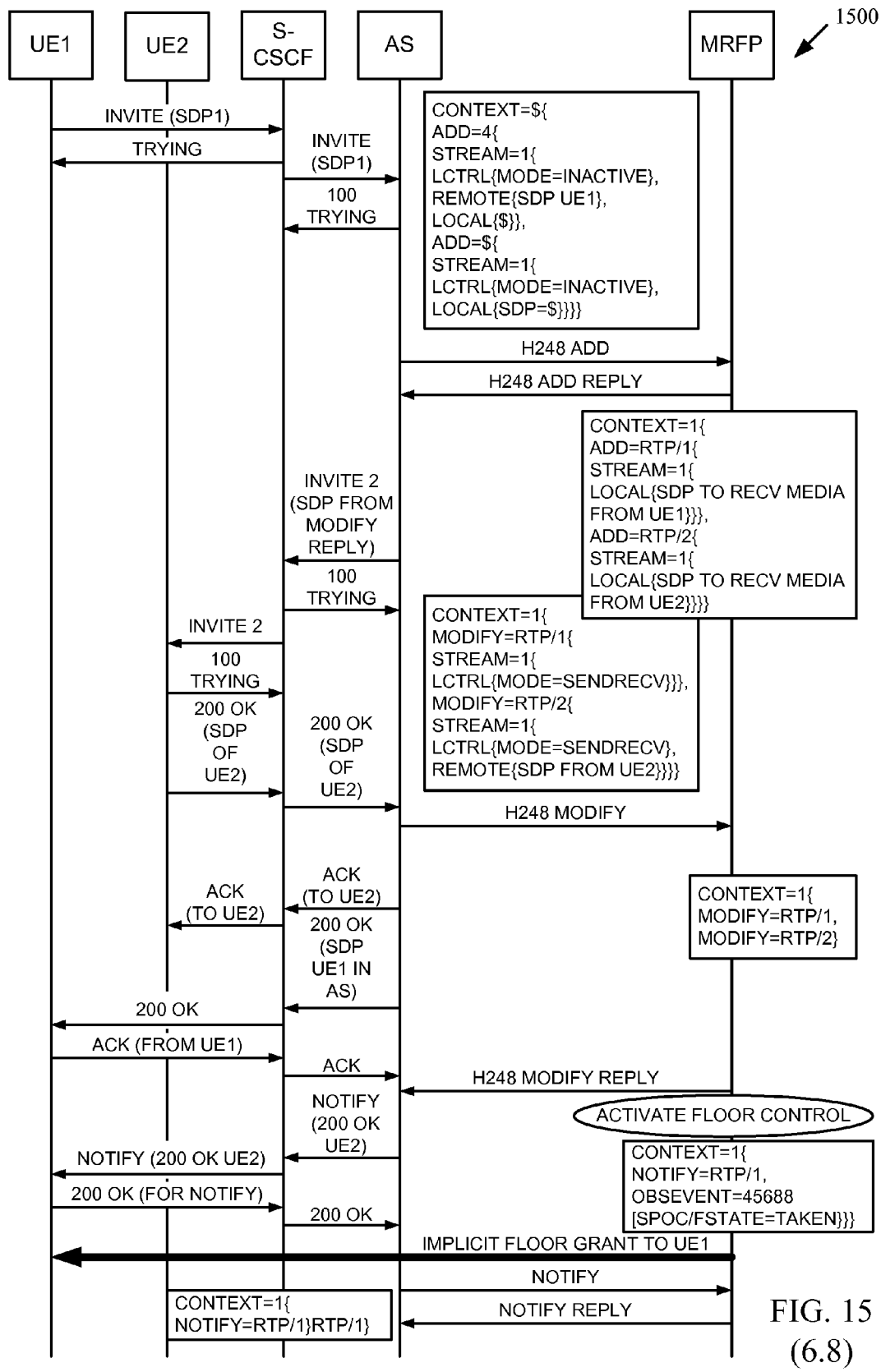
FIG. 15 (6.8)

PUSH-TO-TALK APPARATUS AND METHOD FOR COMMUNICATION BETWEEN AN APPLICATION SERVER AND MEDIA RESOURCE FUNCTION PROCESSOR

RELATED APPLICATIONS

This application claims priority to U.S. Prov. No. 60/630,995 filed Nov. 24, 2004, incorporated herein by reference.

FIELD

The present invention relates to a push-to-talk (PTT) and particularly push-to-talk over cellular (POC) apparatus and method for communication between an application server and media resource function processor (MRFP).

BACKGROUND

Conventional techniques for providing push-to-talk (PTT) and push-to-talk over cellular (POC) are known and provide great benefit for users to communicate with a group of other users to coordinate business and social activities. A PTT server manages the conversation to prevent users from talking over one another, which helps to provide a productive conversation since the users often cannot see one another and thus do not know when another user is about the speak. Normally the initiating caller is initially granted the right to speak to the group, which is called the "floor." The speaker with the floor permits that person to speak through the user equipment (e.g. a wireless phone) and have all the other participants listen. If another user wants the floor in order to speak with the group, that user requests the floor and, once granted, can speak to the group.

FIG. 1 depicts a communications network 100 for users 110a-110d to communicate with one another over wireless communication infrastructure including POC servers 112a-112c and core network 120. FIG. 2 depicts a conventional POC server 112 including a POC application server 114 and media resource function controller and processor 116. Conventional techniques for managing the floor control are provided in the POC server 114. However, conventional techniques for managing the floor employ significant communications overhead to manage the push-to talk conversations. This is due at least in part to the incorporation of the floor control in the POC application server 114.

Consequently, there is need for an improved technique for providing push-to-talk communications, and particularly, push-to-talk over cellular that is more efficient than conventional techniques.

SUMMARY

The present invention advantageously provides an efficient technique for push-to-talk (PTT) communications, and particularly for push-to-talk over cellular (POC).

In an exemplary embodiment of the invention, an apparatus for performing push-to-talk communications over a wireless network comprises a push-to-talk (PTT) server including an application server (AS) and a media resource function processor (MRFP) configured to communicate with user equipment over a wireless link. The application server includes a media resource function controller (MRFC), and the MRFP is configured to provide floor control in a push-to-talk session. By placing the floor control in the MRFP, the invention may advantageously relieve overhead associated with conventional push-to-talk session management.

In one aspect of the invention, a plurality of handsets is provided where each handset is capable of communicating with an application server and each handset includes a floor request switch configured to selectively generate a floor request signal. The MFRP is configured to receive a floor request signal and to selectively grant floor control to a requesting user.

In another aspect of the invention, the MRFP controls the floor state independent of the MRFC.

In yet another aspect of the invention, the PTT server includes a plurality of MRFPs each configured to provide floor control in a push-to-talk session.

In another exemplary embodiment of the invention, an apparatus for performing push-to-talk communications over a wireless network comprises a plurality of push-to-talk (PTT) servers coupled to one another over a communications network, wherein each PTT server includes an application server and a media resource function processor (MRFP) configured to communicate with user equipment over a wireless link, and wherein the application server includes a media resource function controller (MRFC). One of the PTT servers is a controlling server and other PTT servers are participating servers. The MRFP in the controlling PTT server is configured to provide floor control in a push-to-talk session.

Advantages of the invention include an efficient technique for providing push-to-talk communications.

DESCRIPTION OF THE FIGURES

The foregoing and other features, aspects, and advantages will become more apparent from the following detailed description when read in conjunction with the following drawings, wherein:

FIG. 15 depicts a call flow according to an embodiment of the invention.

GLOSSARY

AS—Application Server
AFC—activate floor control
B2BUA—Back to Back User Agent
FCP—floor control package
H.248—Voice over Internet Protocol (VoIP) technical standard
IMS—IP Multimedia Subsystem
MRFC—Media Resource Function Controller
MRFP—Media Resource Function Processor
POC—Push-to-talk Over Cellular
PTT—Push-To-Talk
RTCP—Real-time Transport Control Protocol
RTP—Real-time Transport Protocol
SDP—Session Description Protocol
S-CSCF—Serving Call/Session Control Function
SDP—Session Description Protocol
SIP—Session Initiation Protocol
UE—User Equipment
URI—Uniform Resource Identifier

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to push-to-talk over cellular (POC) communications, but other communications protocols and structures can be used in the invention. Likewise, reference is made to Internet Protocol, packets and cells, while other forms of protocols, data and addresses can be used in the invention.

A. Architecture

Figure 1:
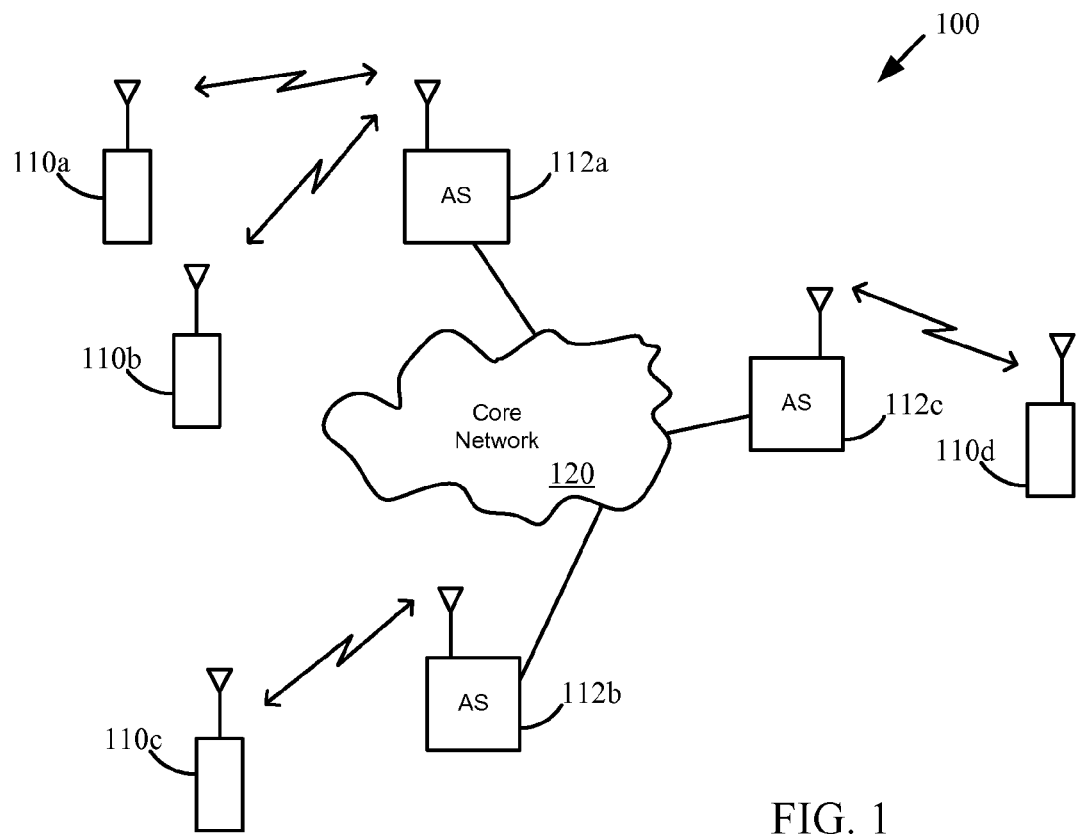
FIG. 1 depicts a communications network for users to communicate with one another over wireless communication infrastructure.
Figure 2:
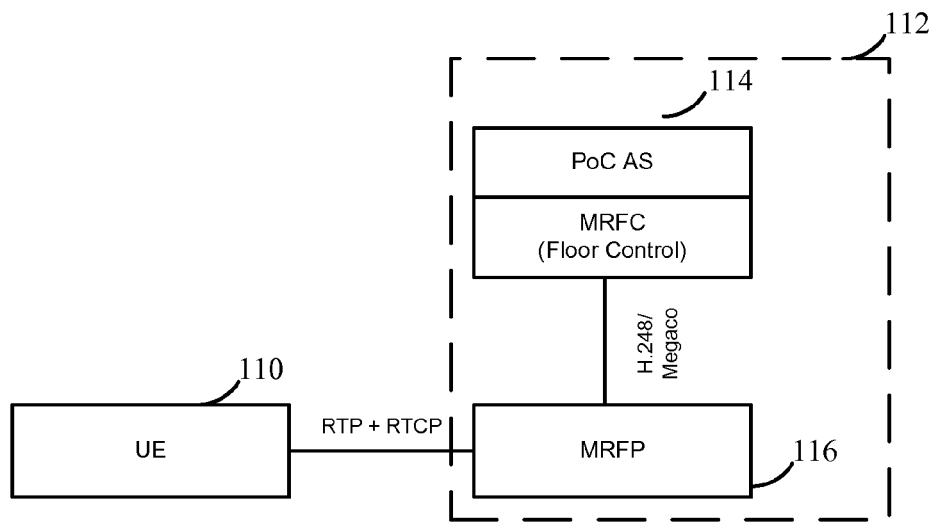
FIG. 2 depicts a conventional POC server.

As described above, FIG. 1 depicts a communications network 100 for users 110a-110d to communicate with one another over wireless communication infrastructure including PTT servers 112a-112c and core network 120. FIG. 2 depicts a conventional POC technique.

In a POC session, the MRFP implements the media processing and switching function in according with a floor control policy. When a user wishes to speak, a floor request is sent to the MRFP using RTCP packets. Depending on the current floor state, the floor control mechanism allows or rejects the floor request. The floor control mechanism may be invoked in the MRFC or MRFP. Carrier grade high performance and high capacity POC servers can accommodate thousands of simultaneous POC sessions, each with multiple parties. In a high capacity system, if the floor state is controlled by the MRFC, there will be heavy traffic between the MRFP and the MFRC, and may lead to increased queuing delays for other real-time signaling between the MRFC and MRFP. Having the floor control in the MRFP reduces the number of messages sent between the MRFC and MRFP, and decreases the latencies in sending the floor state information to the UEs in a POC session.

Figure 3A:
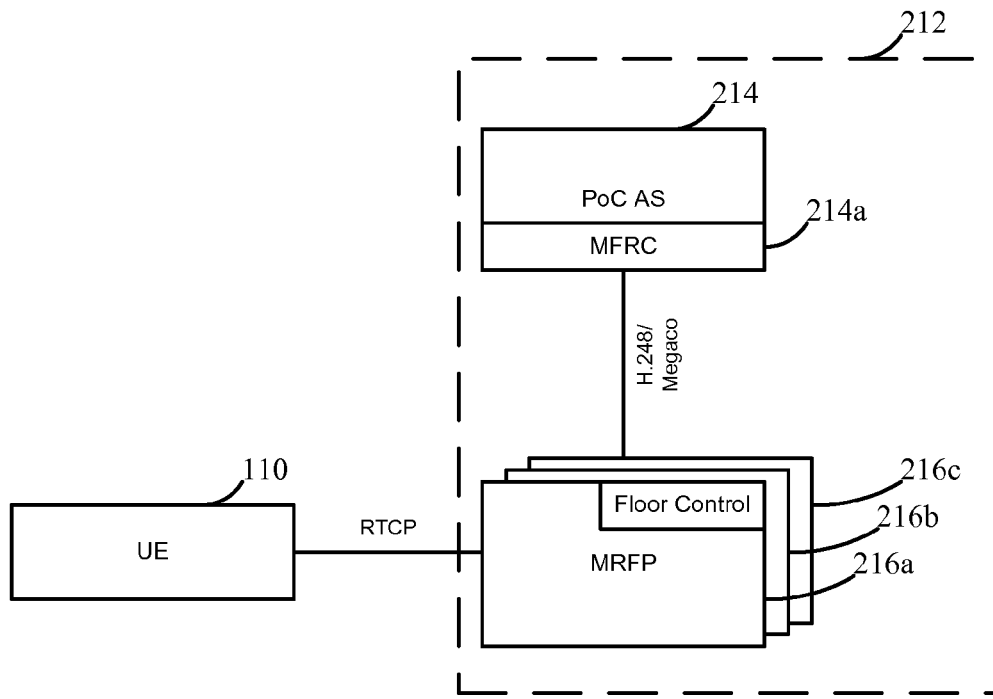
FIGS. 3A-C depicts a POC server according to embodiments of the invention.
Figure 3B:
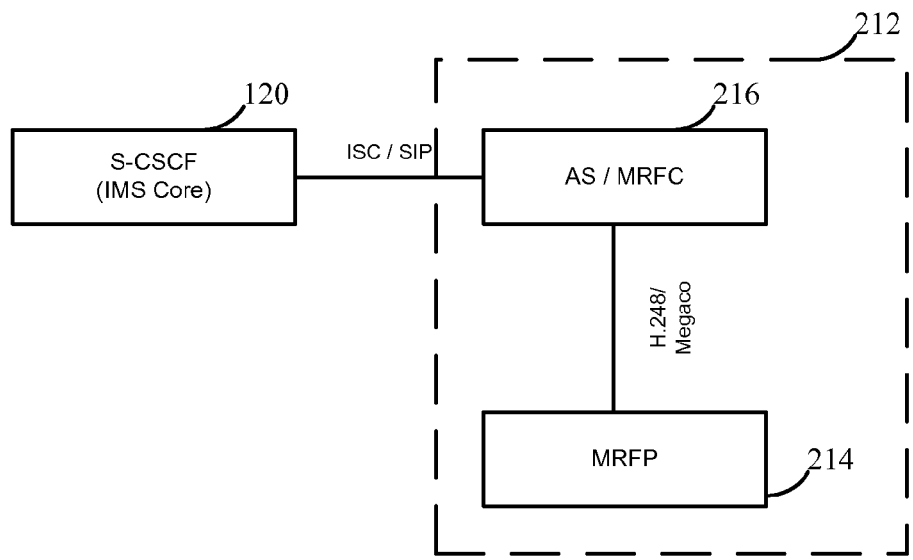
Figure 3C:
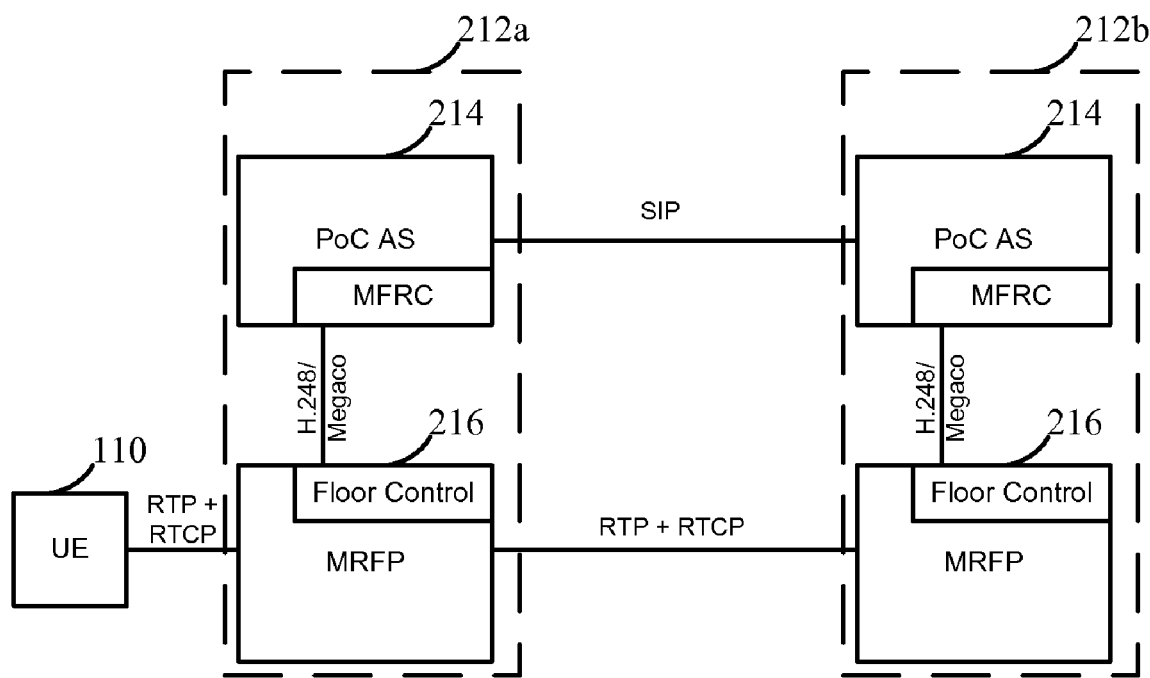

In order to distinguish the invention from the conventional technique, the reference numbers in FIG. 3 use the 200 series. FIGS. 3A-C depicts a POC server 212 according to embodiments of the invention. A POC server 212 includes a Push-To-Talk over Cellular (POC) Application Server 214 (AS) and a Media Resource Function (MRF). The MRF is split into the Media Resource Function Controller 214a (MRFC) and the Media Resource Function Processor 216 (MRFP). The MRFC interprets requests from the POC AS, and controls media streams in the MRFP using H.248 signaling. The MRFC 214a is implemented as an integral part of the POC AS 216. The Media Server implements the MRFP component of the POC server. Reference to the MRFC in the context of the invention implies the MRFC component of the AS.

The invention defines a private H.248 package to establish POC calls in a MRFP using H.248 signaling when the floor state in a POC session is not controlled from the MRFC.

The POC AS establishes POC media sessions in the MRFP by terminating SIP signaling from the S-CSCF, and mapping it to H.248 signaling via the MRFC component of the AS. The MRFC installs the POC package (sPOC) in H.248 terminations that are involved in a POC call in order to invoke POC specific features defined in the POC specifications. The MRFC maps information received by the AS in SIP messages to POC related properties, events, and signals that are defined in the POC Package (sPOC). A POC session is mapped to a H.248 context, and each participant in the POC session is mapped to a H.248 termination in the context.

Referring to FIG. 3A, the POC server 212 may be scaled to include a plurality of MRFPs 216a-216c to provides a plurality of media resource processors. In an aspect of the invention, the MRFPs 216a-216c are independent and may process multiple conversations including managing the floor control in the conversations. While the exemplary MRFPs are depicted in FIG. 3A, any number can be used in the invention.

In a POC session, the floor control mechanism allows one user to speak at any given time, after the user have been granted the floor in accordance with the procedures and policies defined by the floor control mechanism. The floor control mechanism is activated by the controlling entity (MRFC in this case) after the controlling entity has completed all signaling procedures to establish the POC session, and the POC session members are able to send and receive media. After activation, the floor control mechanism maintains floor state independent of the controlling entity, and the controlling entity is not able to control the floor state. Controlling entity (MRFC) sends an indication to the controlled entity (MRFP) in order to direct the controlled entity to activate the floor control mechanism. In case of a POC session, if H.248 is used as the protocol between the controlled entity and the controlling entity, an H.248 signal is played on a termination that corresponds to the user that initiated the session. Alternatively, the MRFP may use the stream mode transition from inactive to Send-Only, or Send-Receive as an indication to send the implicit floor grant message to the user that initiated the session.

Referring to FIG. 3C, a plurality of push-to-talk (PTT) servers are coupled to one another over a communications network, wherein each PTT server includes an application server and a media resource function processor (MRFP) configured to communicate with user equipment over a wireless link, and wherein the application server includes a media resource function controller (MRFC). One of the PTT servers is a controlling server 212b and other PTT servers are participating servers 212a. The MRFP in the controlling PTT server is configured to provide floor control in a push-to-talk session.

B. Operation

FIGS. 4-14 depict call flows according to embodiments of the invention. These exemplary call flows demonstrate the methods that the invention provides to manage the floor control process.

1. SIP-H.248 Interworking for POC

A basis for the invention is an exemplary SIP-H.248 Interworking for POC. An INVITE signal from an inviting UE is translated to an H.248 Add command, which is sent to the MRFP by the MRFC. A POC session is represented by an H.248 context in the MRFC and the MRFP. Each UE is represented as an H.248 termination in the context. Each termination has a stream representing the RTP media to/from the UE. The RTCP stream is implied, and H.248 does not add a separate stream for RTCP packets. The MRFP allocates resources to send and receive RTCP packets when a RTP stream is added, and the RTCP port is RTP port+1, unless a RTCP port is specified using some other means such as the SDP content of a SIP message. The topology descriptor is not supported in the exemplary embodiment, but may be supported in alternate embodiments. Instead, all streams are connected by using the same stream Id in all terminations. A private package is defined for implementing POC with H.248, and the package is referred to as "sPOC." The "sPOC" package defines the POC version property (sPOC/ver) in the termination state descriptor of each termination. The MRFP uses this property to detect that this is a POC call, and the MRFP invokes procedures for establishing a PoC session on receipt of an Add command from the MRFC.

2. Call Flow Use Cases

Figure 4:
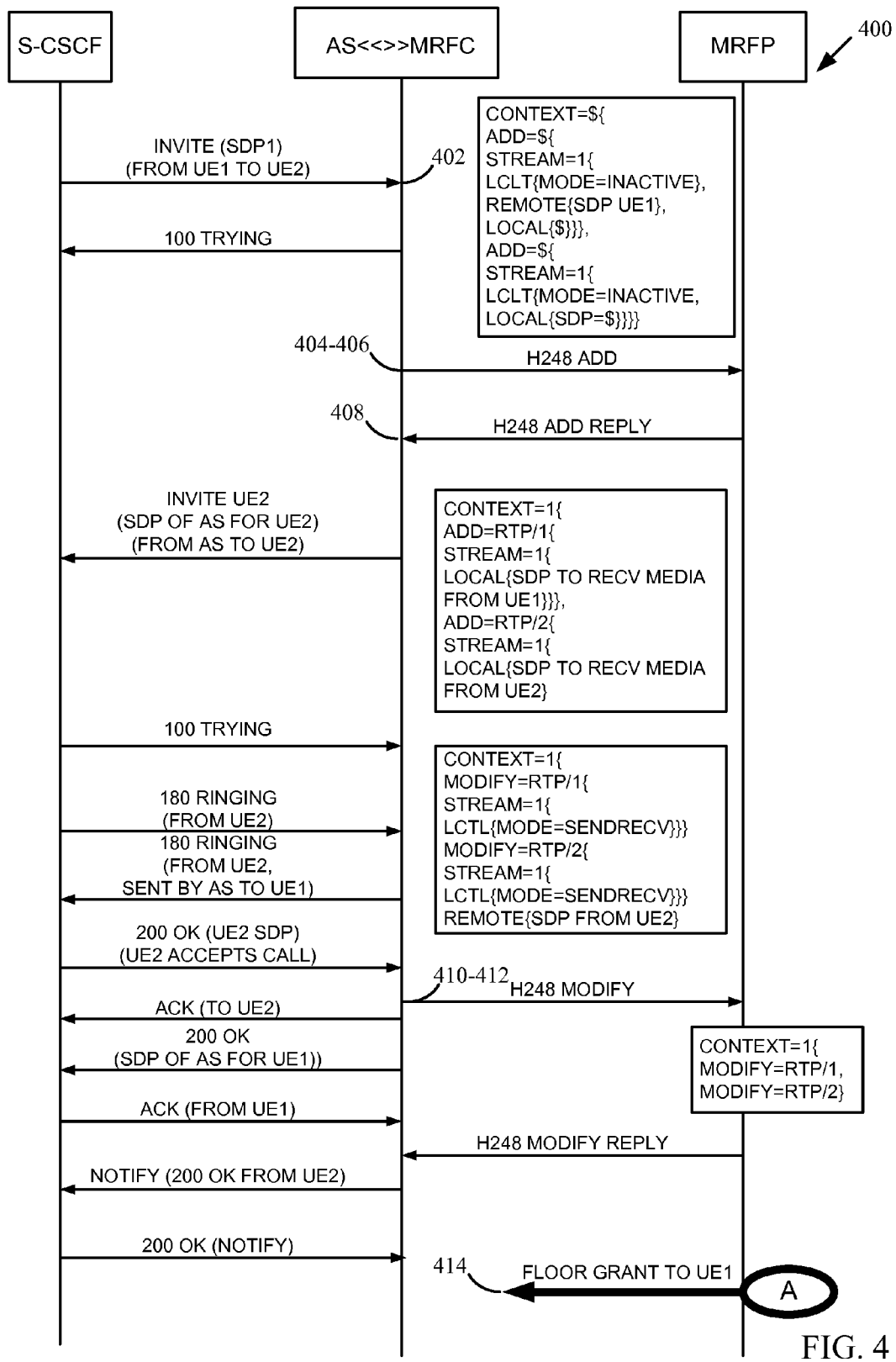
FIG. 4 depicts a call flow according to an embodiment of the invention.

FIG. 4 depicts a call flow demonstrating Instant Personal Talk, Late media, controlling. When a UE wishes to establish a 1-1 instant call, the UE sends a SIP INVITE to the IMS core along with the SIP URI of all the callee(s) in the Refer-To header. The INVITE contains the media capabilities of the inviting UE, including the codec, and IP address/port on which the UE is willing to receive media. The IMS core routes this invite to the AS 112, which invokes the procedures to establish the originating call leg. The AS acts as a B2B UA, and sends an INVITE to the callee(s) with the media capabilities of the POC server, including the codec, and the IP address/port on which the POC server is willing to receive media, from the invited UE. As a part of the call leg establishment procedure, the AS allocates media resources in the MRFP by sending H.248 commands to the MRFP as shown in the FIG. 4 call flow. The call flows focus on interactions between the MRFC and MRFP.

Referring to FIG. 4, a number of steps are identified for the call flow. While these steps are shown in a particular order, embodiments and aspects of invention can implement the steps in another order. In step 402, the AS received an INVITE from UE1, with SIP URI of UE2 in the Refer-To Header. In step 404, the AS/MRFC adds two terminations in the media server (MRFP), RTP/1 for UE1, and RTP/2 for UE2. In step 406, the AS directs the MRFP to allocate resources for one audio stream in each termination. In step 408, in the reply from MRFP to MRFC, the MRFP returns the media parameters to receive media on each stream in the SDP present in the local descriptors. In step 410, the AS sends the above SDP received in the 200 OK in step to the MRFP as a Modify command for the termination corresponding to UE2 in the remote descriptor, and sets the stream mode of the streams in both the terminations to "send-recv." In one embodiment, the Modify command can be performed earlier in the call flow. In step 412, the AS also sets the FCP/AFC property to TRUE for the termination corresponding to UE1 (RTP/1) in the Modify command sent above in step 410. In step 414, the MRFP invokes the default floor control mechanism for the POC call (depending on POC version), and sends a FLOOR GRANT to UE1, and the POC call is now established. Exemplary software routines to perform these functions is provided under the heading Software below.

Figure 5:
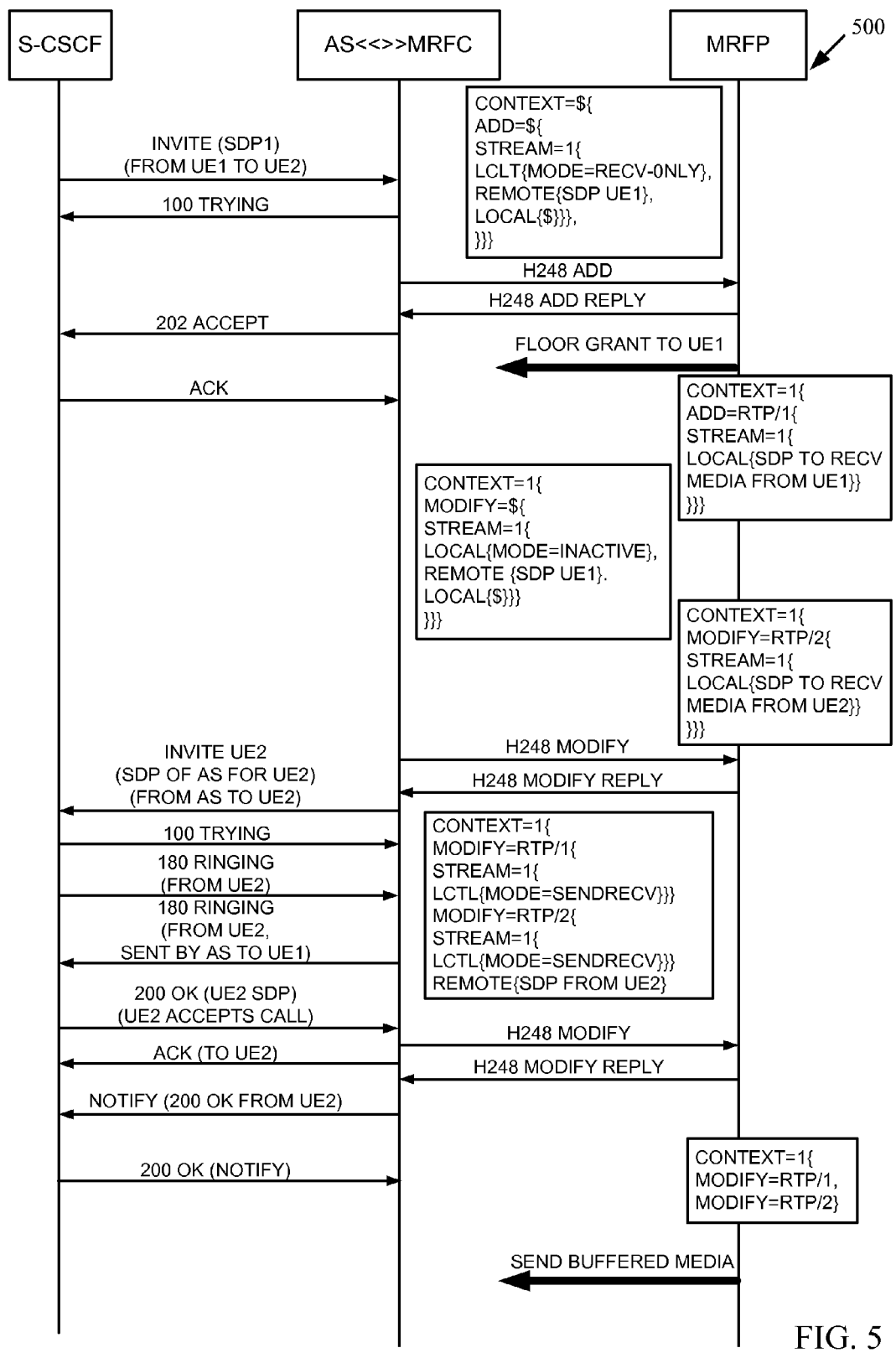
FIG. 5 depicts a call flow according to an embodiment of the invention.

FIG. 5 depicts a call flow demonstrating 1-1 instant personal talk, early media, controlling.

Figure 6:
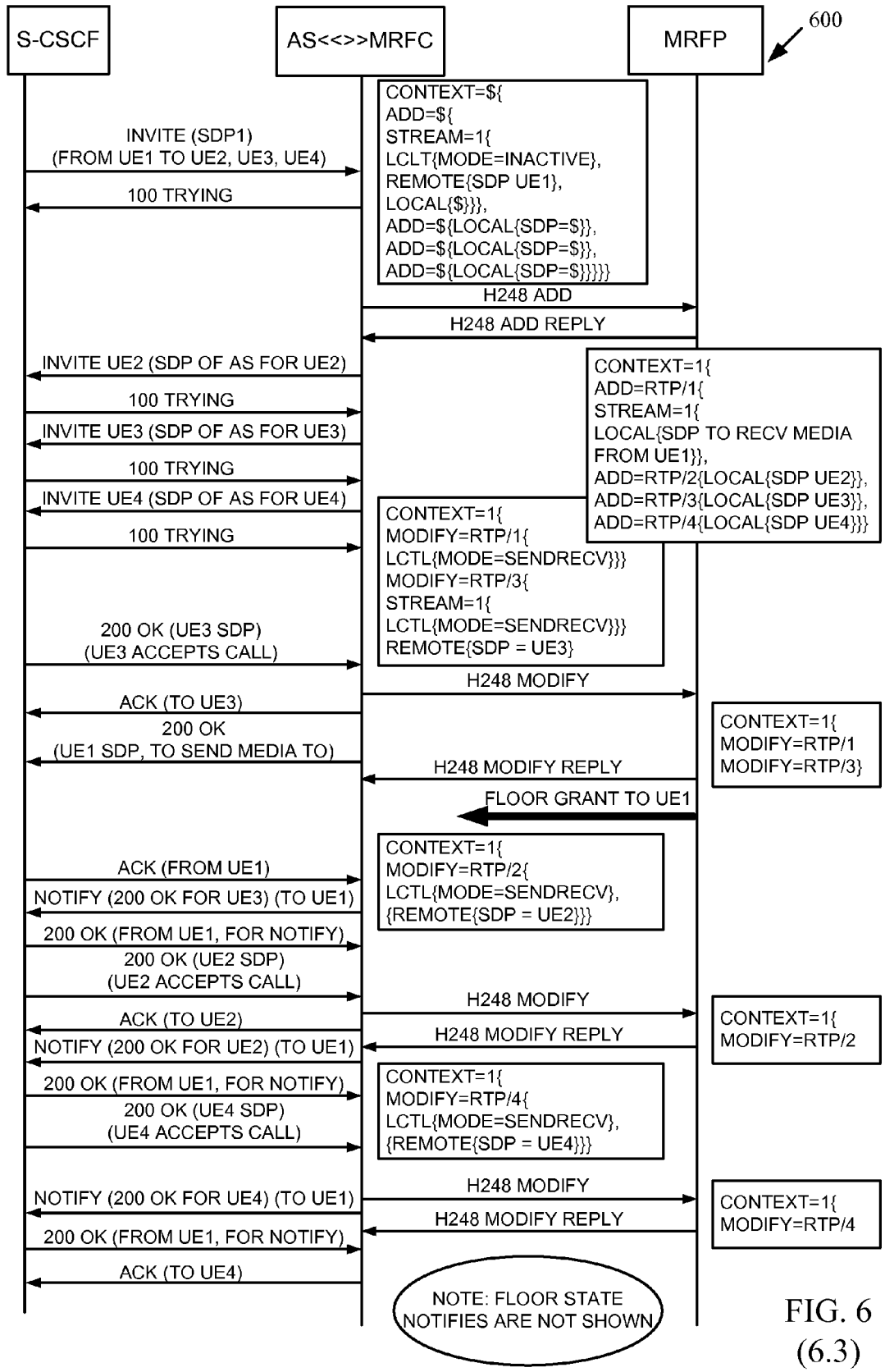
FIG. 6 depicts a call flow according to an embodiment of the invention.

FIG. 6 depicts a call flow demonstrating ad-hoc instant group talk, late media, controlling.

Figure 7:
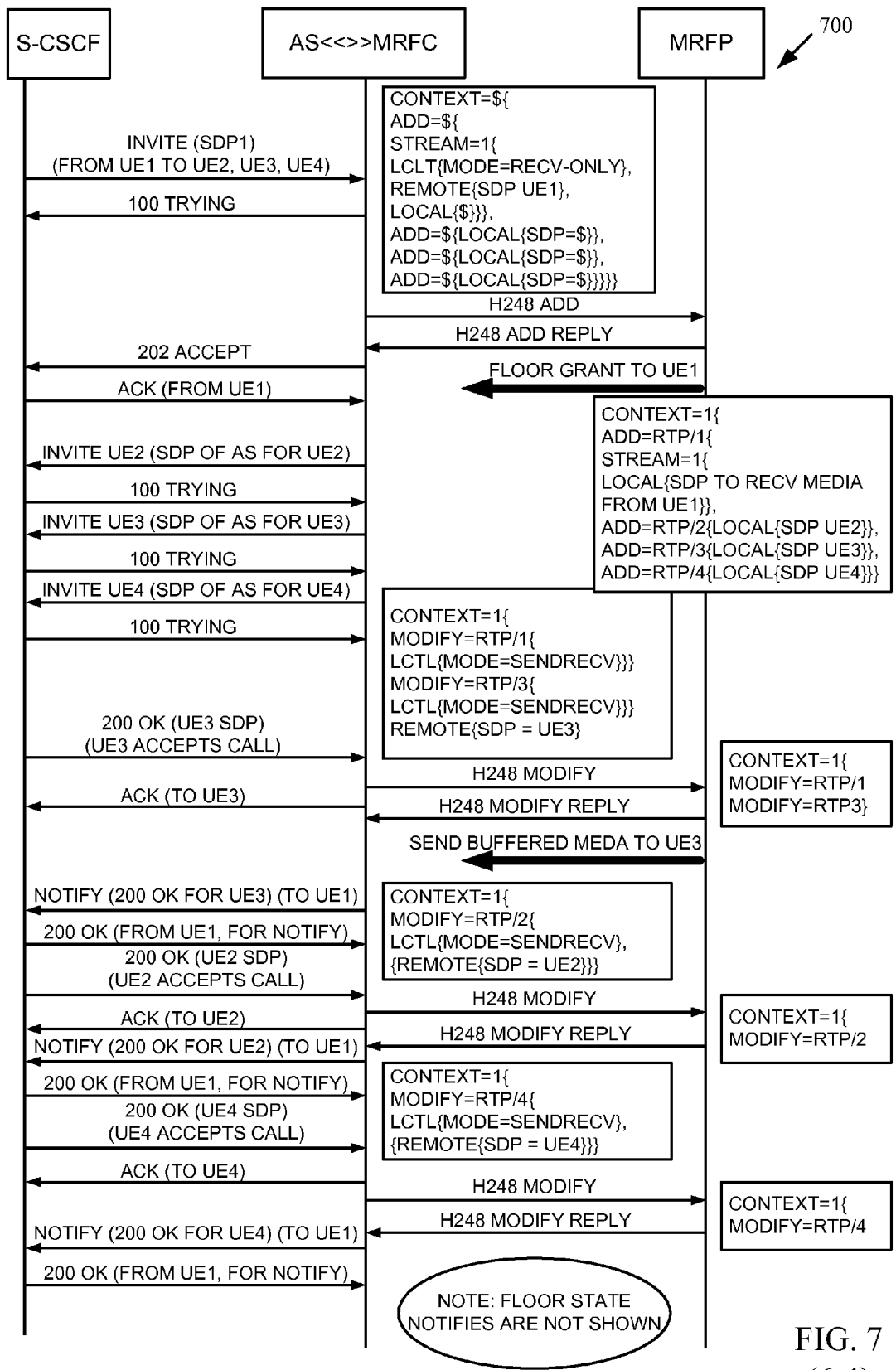
FIG. 7 depicts a call flow according to an embodiment of the invention.

FIG. 7 depicts a call flow demonstrating ad-hoc instant group talk, early media, controlling.

Figure 8:
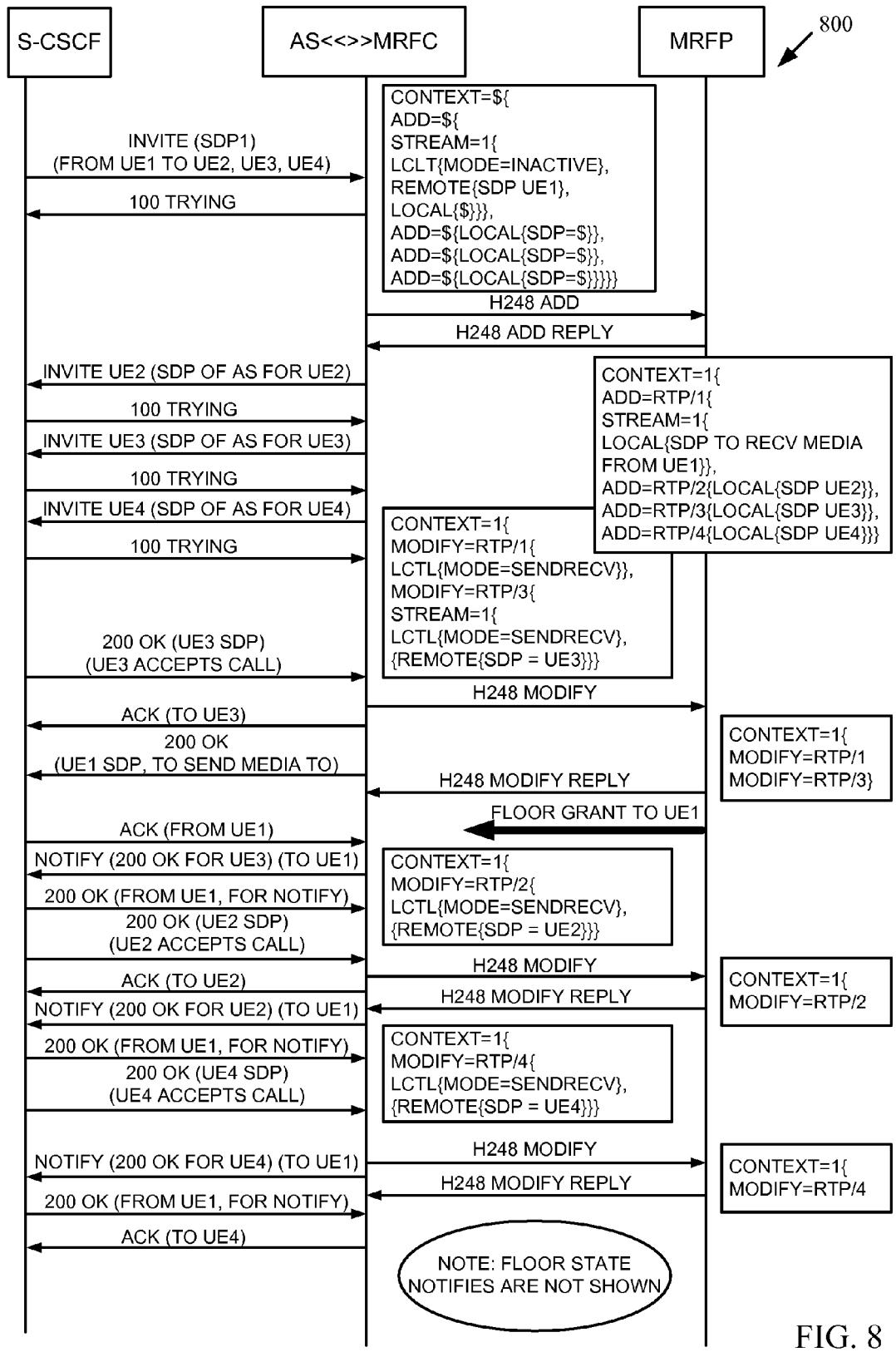
FIG. 8 depicts a call flow according to an embodiment of the invention.

FIG. 8 depicts a call flow demonstrating instant group talk, late media, controlling. In one aspect, there is no difference between ad-hoc, and instant group calls in terms of H.248 Signaling.

Figure 9:
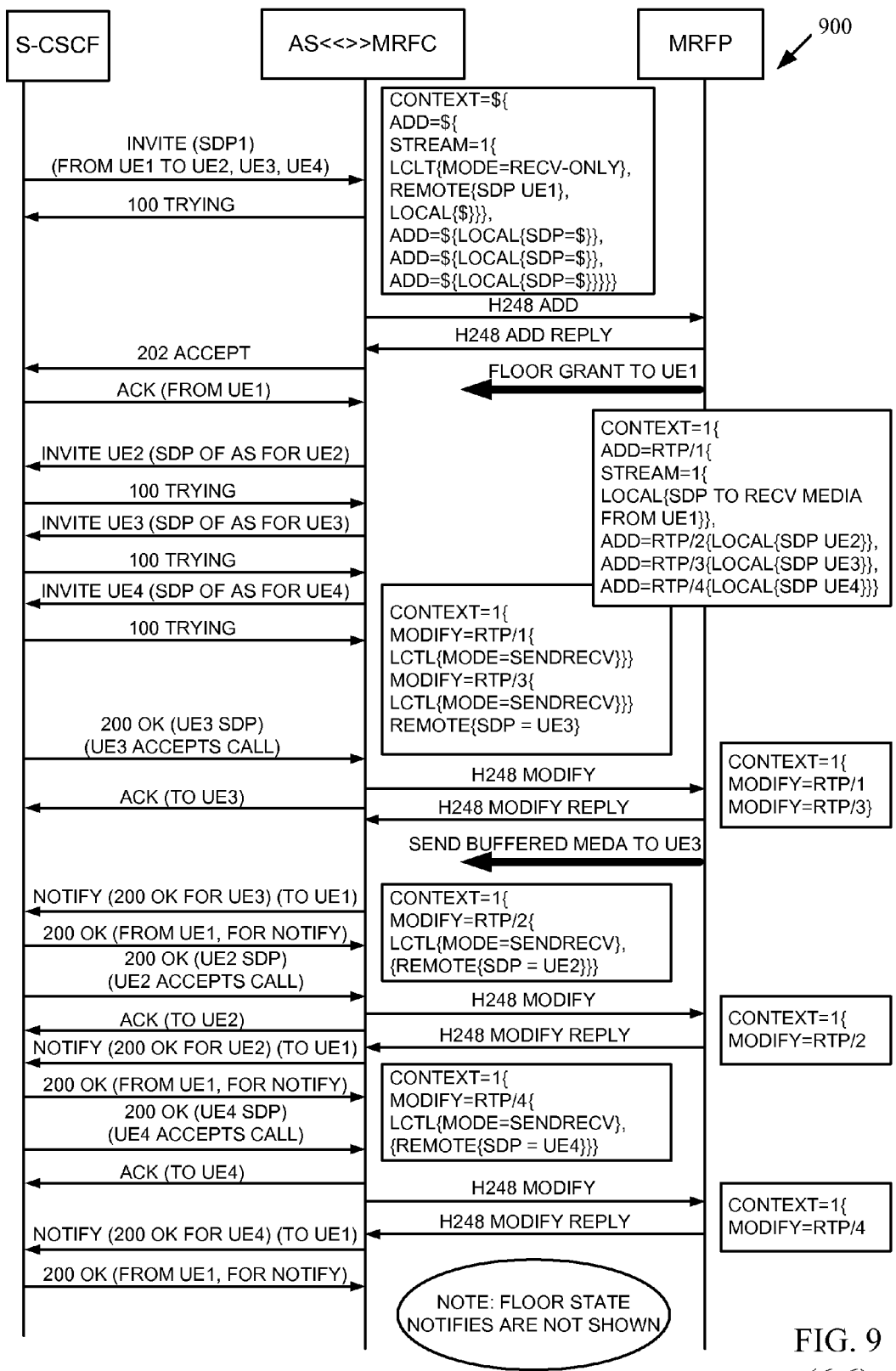
FIG. 9 depicts a call flow according to an embodiment of the invention.

FIG. 9 depicts a call flow demonstrating instant group talk, early media, controlling. In one aspect, there is no difference between ad-hoc, and instant group calls in terms of H.248 Signaling.

Figure 10:
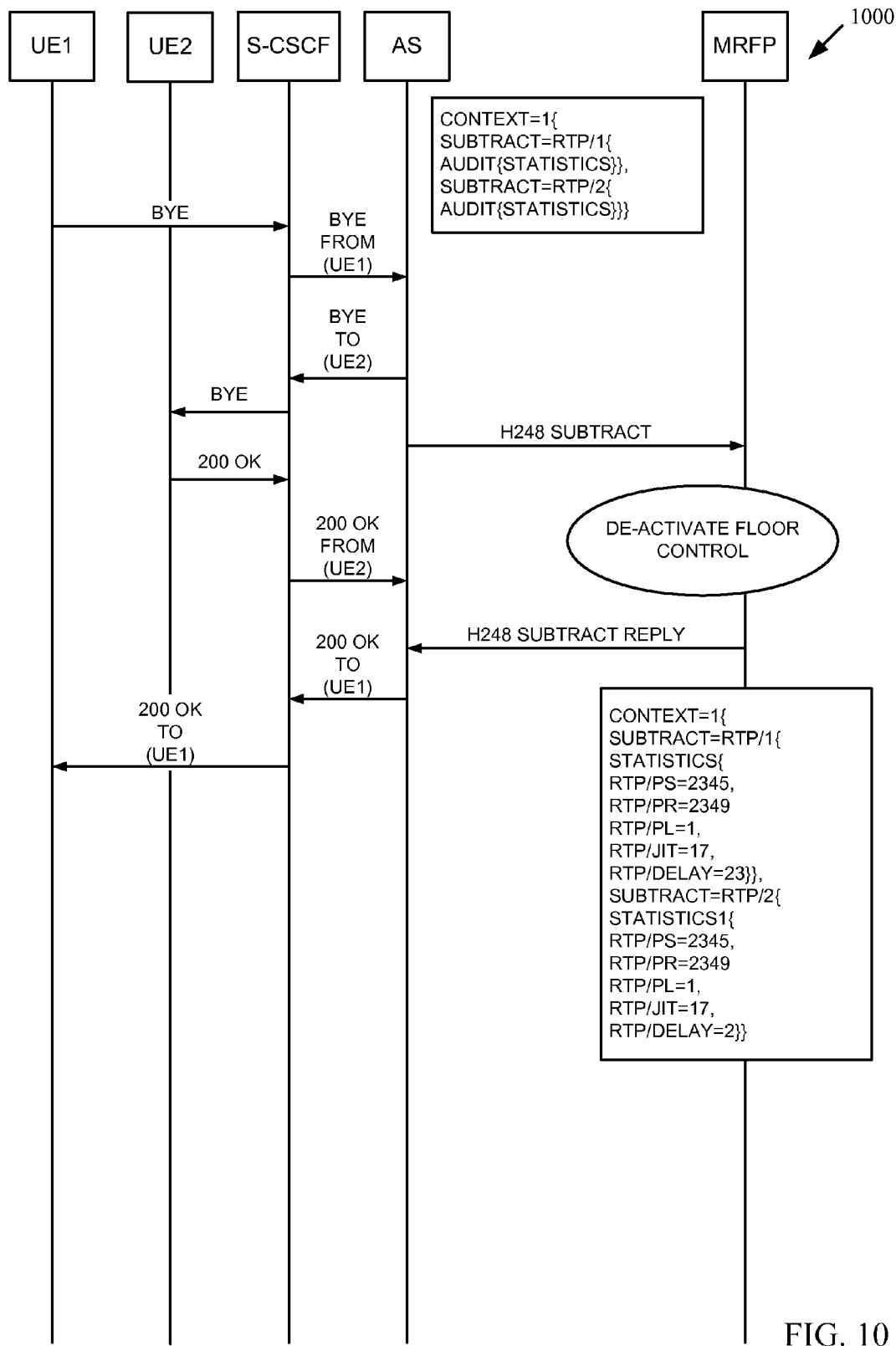
FIG. 10 depicts a call flow according to an embodiment of the invention.

FIG. 10 depicts a call flow demonstrating disconnect from an active talk session, e.g., 1-1 instant personal talk.

FIGS. 11—15 demonstrate in-call H.248 signaling, which is directed to use cases that describe H.248 signaling after the call is established.

Figure 11:
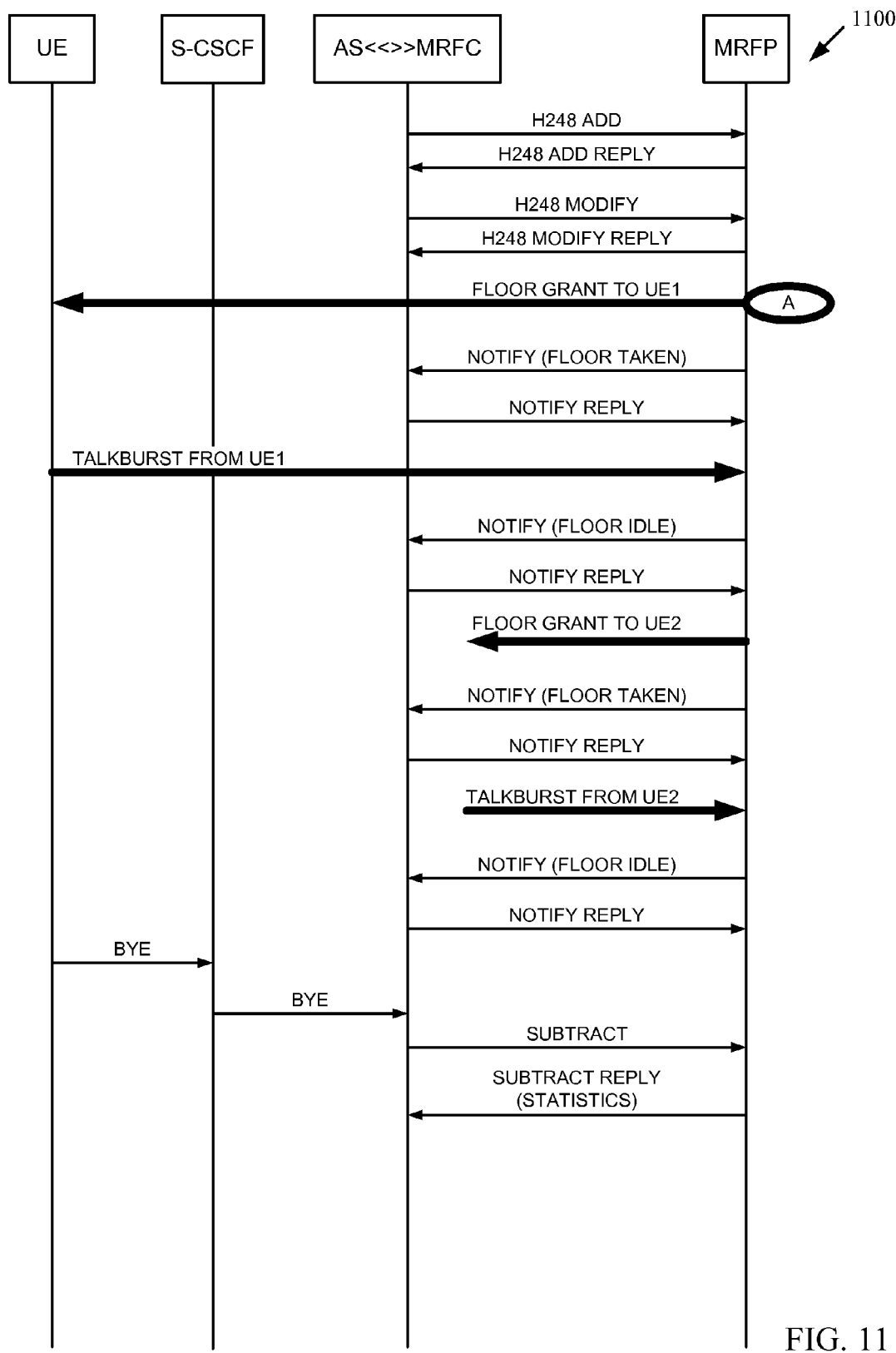
FIG. 11 depicts a call flow according to an embodiment of the invention.

FIG. 11 depicts a call flow demonstrating instant personal talk, 1-1 ad-hoc call, late media, controlling. In one aspect, the H.248 signaling remains the same in case of a group call, since POC is a half duplex application, and at any given time, MRFP will receive talk burst on at most one termination is a context.

Figure 12:
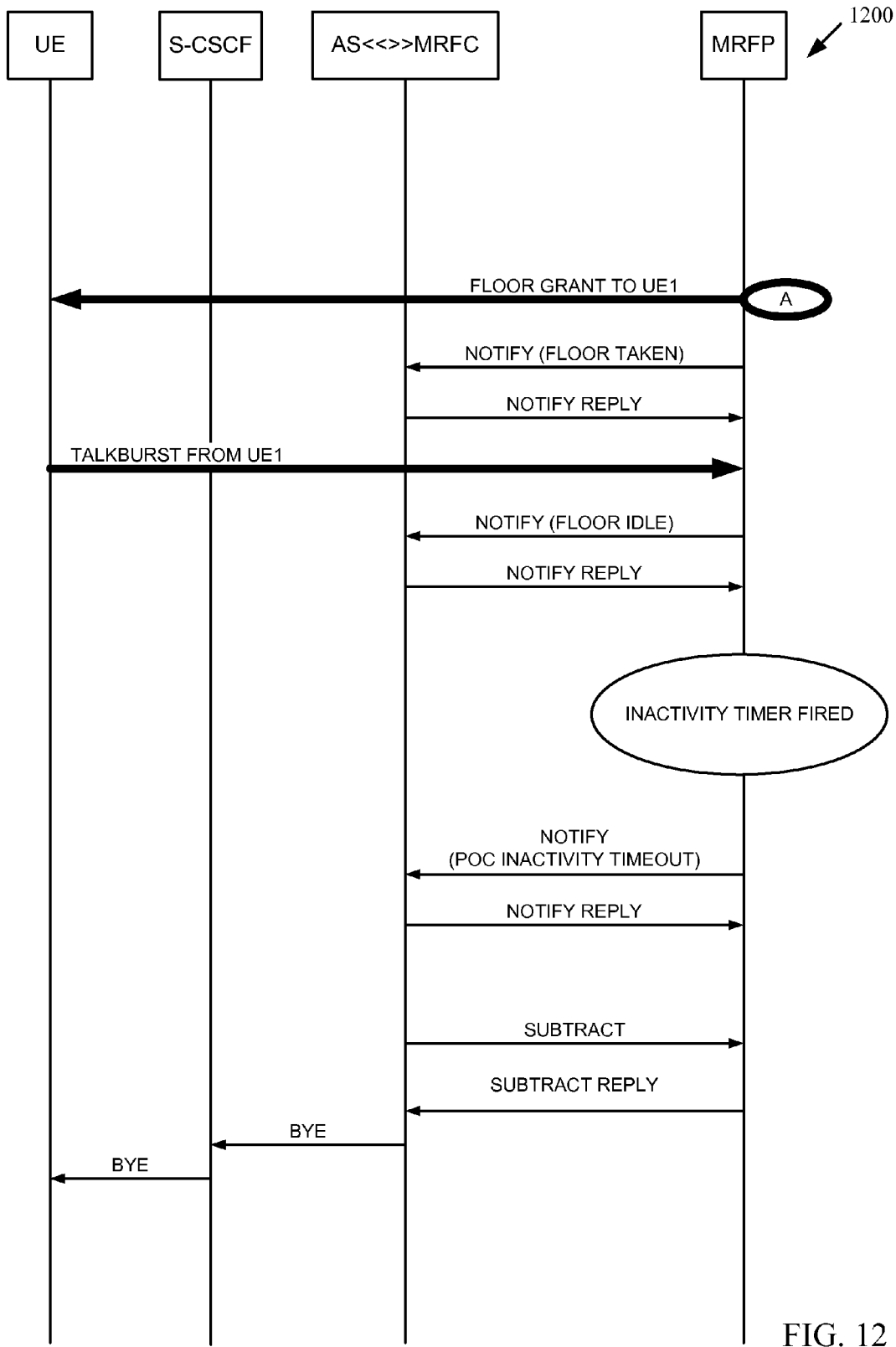
FIG. 12 depicts a call flow according to an embodiment of the invention.

FIG. 12 depicts a call flow demonstrating Inactivity timer indication. Inactivity timeout results in a NOTIFY indication from the MRFP to the MRFC. The MRFC detects the timeout, and initiates call teardown procedures by sending a SUBTRACT to the MRFP, and a BYE to all the UEs involved in the call.

Figure 13:
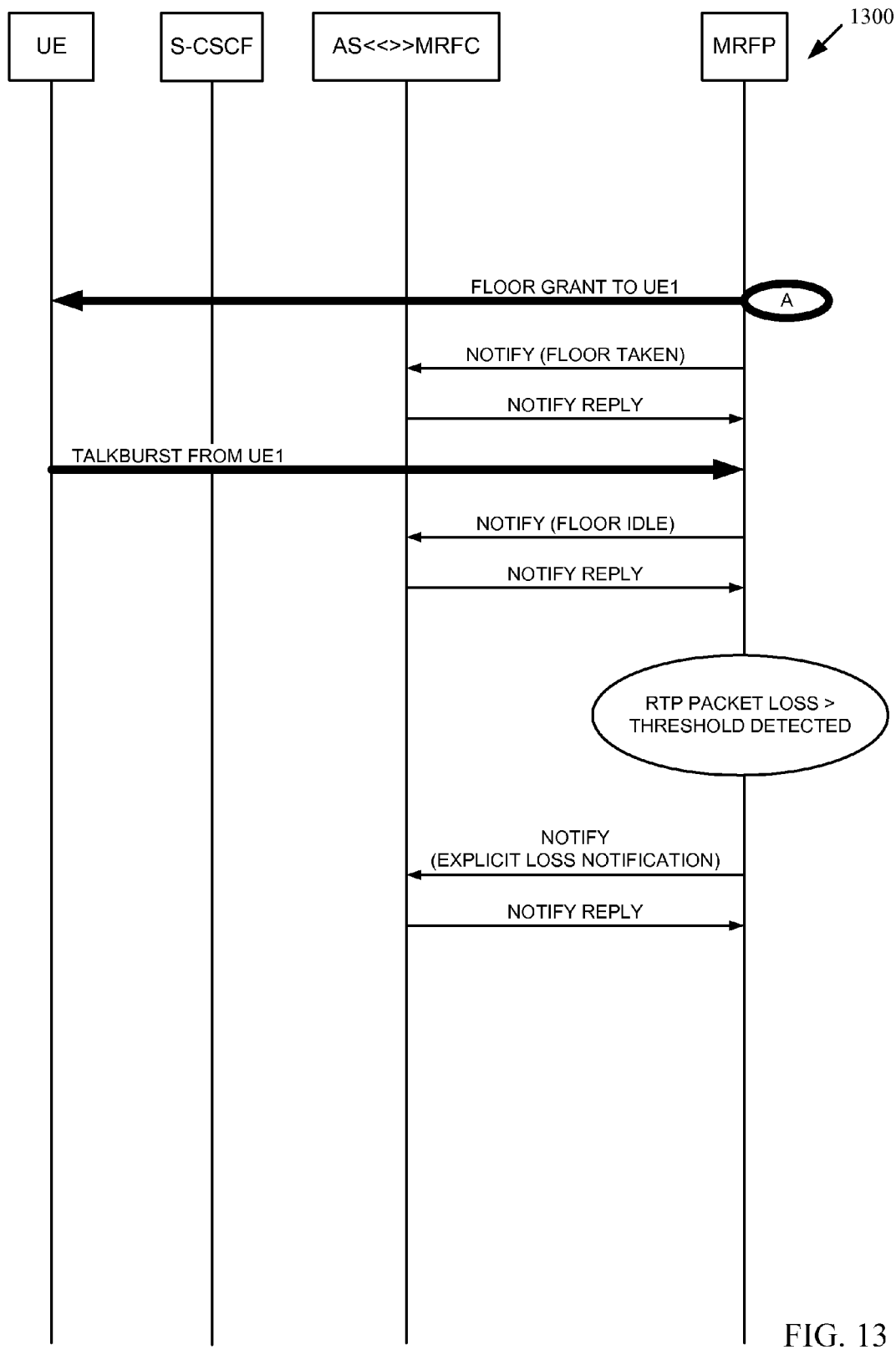
FIG. 13 depicts a call flow according to an embodiment of the invention.

FIG. 13 depicts a call flow demonstrating explicit loss notification, user plane adaptation. The MRFP detects packet loss above the threshold limit, and sends a NOTIFY indication to the MRFC.

Figure 14:
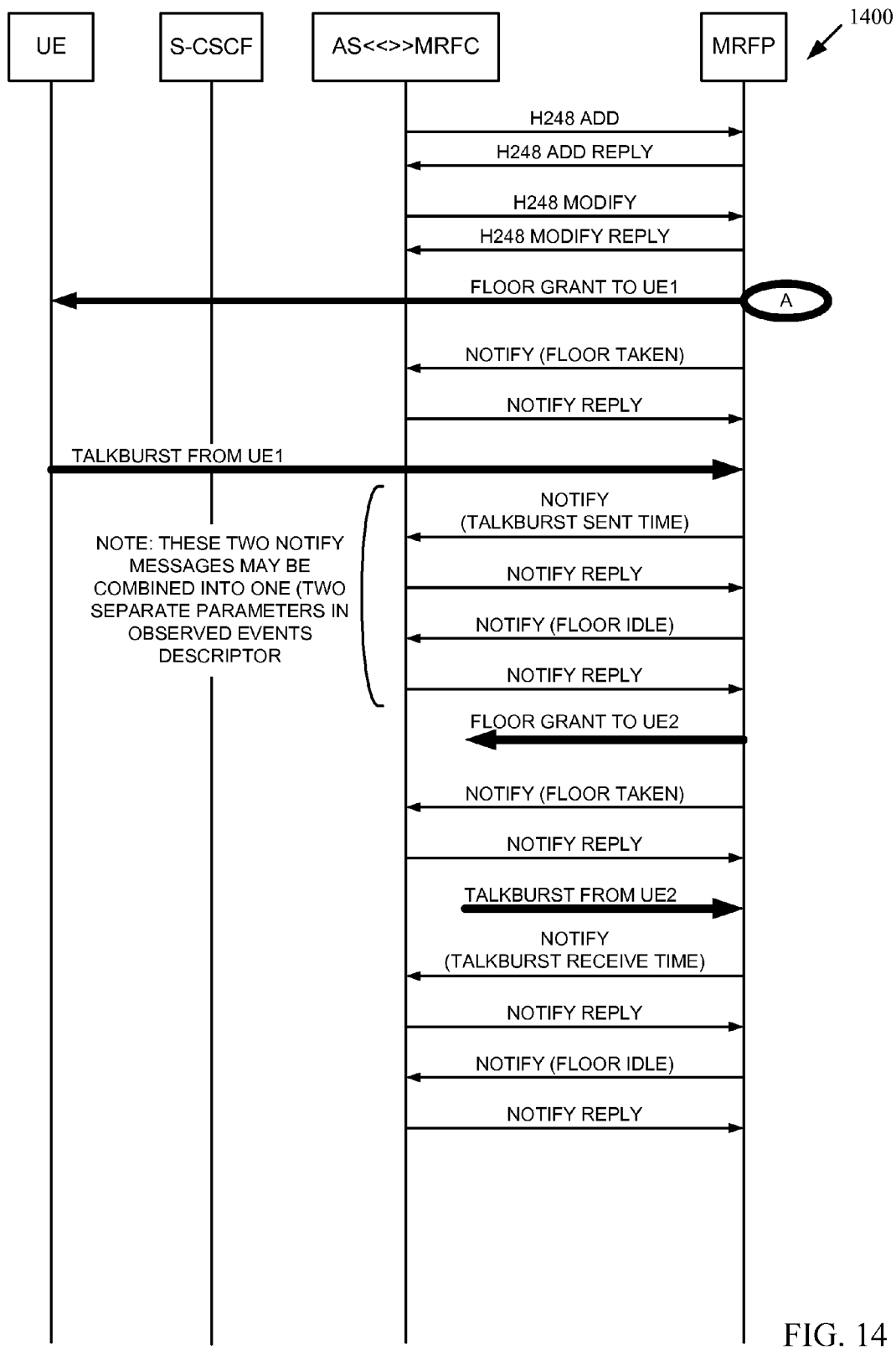
FIG. 14 depicts a call flow according to an embodiment of the invention.

FIG. 14 depicts a call flow demonstrating talk burst time and volume for prepaid charging. In the prepaid charging model, the charging of the POC server may be based on the talk burst duration, and talk burst volume. When this charging model is adopted, then MRFP will send an additional NOTIFY at the end of each talk burst with the Sent Time and Receive Time and the address of the source POC client, and the list of reached POC participants.

FIG. 15 depicts a call flow demonstrating 1-to-1 call flow, overall call flow, 1-to-1 instant personal talk call, late media:

C. Exemplary Software Routines

---

1. H248 ADD from AS/MRFC to MRFP
MEGACO/2[10.1.1.5]:55555
Transaction = 1000 {
  Context = $ {
    Add = RTP/$ {
      Media {
        TerminationState {
            ServiceStates = InService,
            EventBufferControl = OFF,
            sPOC/POCver = POC1, ;POC version, call type
            sPOC/embuf = 0, ;late media call, so early media
        buf 0
            sPOC/sipuri = sip:clientA@homerealm, ; used as
        CNAME in first RTCP floor taken messages only (talker identity)
            sPOC/psrole = CT, ;controlling role
            sPOC/fcm=POC1, ;POC consortium POC1
            fcp/afc = off ;dont activate floor control -continued

```
        },
        Stream = 1 {
            LocalControl {
                Mode = Inactive,
                ReservedValue = OFF ,
                ReservedGroup = OFF
            },
            Local {
                v=0
                o=12345678995 0 0 IN IP4 $
                s=POC-Call
                c=IN IP4 $
                t=0 0
                m=audio $ RTP/AVT 97
                a=rtpmap:97 AMR/8000/1
                a=fmtp:97 mode-set=0,1,2
                a=fmtp:97 octet-align=1
                a=ptime:160
                a=maxptime:400
                a=+g.POC.talkburst
            },
            Remote {
                v=0
                o=12345678995 0 0 IN IP4 10.1.254.62
                s=POC-Call
                c=IN IP4 10.1.254.62
                t=0 0
                m=audio 7002 RTP/AVT 97
                a=rtpmap:97 AMR/8000/1
                a=fmtp:97 mode-set=0,1,2
                a=fmtp:97 octet-align=1
                a=ptime:160
                a=maxptime:400
                a=+g.POC.talkburst
            }
        }
    },
    Events = 4568 {
        sPOC/pito ( mit =60 ), ;send notify to MRFC when inactivity timer expires
        sPOC/fstate, ;send notify to MRFC when floor is granted, and when idle
        sPOC/eln (thres = 500 ) ; threshold packet loss after which invoke user plane adaptation
    }
},
Add = RTP/$ {
    Media {
        TerminationState {
            sPOC/POCver = POC1,
            sPOC/embuf = 0,
            sPOC/sipuri = sip:12345678996@sonimtalk.com,
            sPOC/fcm=POC1, ;POC consortium POC1
            fcp/afc = off,
            ServiceStates = InService,
            EventBufferControl = OFF
        },
        Stream = 1 {
            LocalControl {
                Mode = Inactive ,
                ReservedValue = OFF ,
                ReservedGroup = OFF
            },
            Local {
                v=0
                o=12345678995 0 0 IN IP4 $
                s=POC-Call
                c=IN IP4 $
                t=0 0
                m=audio $ RTP/AVT 97
                a=rtpmap:97 AMR/8000/1
                a=fmtp:97 mode-set=0,1,2
                a=fmtp:97 octet-align=1
                a=ptime:160
                a=maxptime:400
                a=+g.POC.talkburst
            },
        }
}
```

-continued

```
            }
        }
    }
}
```

2. H248 ADD REPLY from MRFP to AS/MRFC
MEGACO/2[192.168.1.5]:55555

```
Reply = 1000 {
    Context = 123 {
        Add = RTP/1{
            Media {
                Stream = 1 {
                    Local {
                        v=0
                        o=12345678995 0 0 IN IP4 10.1.56.101
                        s=POC-Call
                        c=IN IP4 10.1.56.101
                        t=0 0
                        m=audio 4050 RTP/AVT 97
                        a=rtpmap:97 AMR/8000/1
                        a=fmtp:97 mode-set=0,1,2
                        a=fmtp:97 octet-align=1
                        a=ptime:160
                        a=maxptime:400
                        a=+g.POC.talkburst
                    }
                }
            }
        },
        Add = RTP/2{
            Media {
                Stream = 1 {
                    Local {
                        v=0
                        o=12345678995 0 0 IN IP4 10.1.56.101
                        s=POC-Call
                        c=IN IP4 10.1.56.101
                        t=0 0
                        m=audio 4050 RTP/AVT 97
                        a=rtpmap:97 AMR/8000/1
                        a=fmtp:97 mode-set=0,1,2
                        a=fmtp:97 octet-align=1
                        a=ptime:160
                        a=maxptime:400
                        a=+g.POC.talkburst
                    }
                }
            }
        }
    }
}
```

After this, the AS sends INVITE to UE2 via the S-CSCF, and gets a 200 OK from it, with UE2's SDP.

3. Modify from AS /MRFC to MRFP
MEGACO/2 [10.1.1.5]:55555

```
Transaction = 1001 {
    Context = 123 {
        Modify= RTP/1 {
            Media {
                TerminationState {
                    ServiceStates = InService,
                    EventBufferControl = OFF,
                    sPOC/POCver = POC1,
                    sPOC/embuf = 0,
                    sPOC/cis = sip:clientA@homerealm ,
                    sPOC/psrole = CT,
                    sPOC/fcm=POC1, ;POC consortium POC1
                    fcp/afc = on ;Grant Floor to this termination and
                    Activate floor control mechanism
                },
                Stream = 1 {
                    LocalControl {
                        Mode = sendrecv,
                        ReservedValue = OFF ,
                        ReservedGroup = OFF
                    }
                }
            }
        },
        Modify = RTP/2 {
            Media {
```

-continued

```
    Stream = 1 {
      LocalControl {
          Mode = sendrecv ,
          ReservedValue = OFF ,
          ReservedGroup = OFF
          },
      Remote {
          v=0
          o=12345678995 0 0 IN IP4 13.13.13.13
          s=POC-Call
          c=IN IP4 13.13.13.13
          t=0 0
          m=audio 7003 RTP/AVT 97
          a=rtpmap:97 AMR/8000/1
          a=fmtp:97 mode-set=0,1,2
          a=fmtp:97 octet-align=1
          a=ptime:160
          a=maxptime:400
          a=+g.POC.talkburst
          }
        }
      }
    }
  }
}
4. Modify from reply from MRFP to AS /MRFC
MEGACO/2 [192.168.1.5]:55555
Reply = 1001 {
  Context = 123 {
     Modify = RTP/1,
     Modify = RTP/2
     }
}
```

D. POC Package Parameters

PackageID: sPOC (0×800b) (Package ID needs to be registered with IANA)

Description: This package defines new properties for H.248/POC interworking when Floor control is not managed by the MGC.

Version: 1
Designed to be extended only: No
Extends: None

1. Properties

POC Version
PropertyID: POCver, (0×0001)
Description: This property indicates the highest version POC supported.
Type: Enueration
Characteristics: Read
Defined in: TerminationState descriptor
Possible values: The POC version may be specified as:
"POC1" (0×0000)
"POC2" (0×0001)
Default value is "POC2"

POC Server Role
PropertyID: psrole, (0×0002)
Description: This property indicates if POC server is participating, controlling, or both.
Type: Enumeration
Characteristics: Read
Defined in: TerminationState descriptor
Possible values: The POC server role property may be specified as:
"CT" (0×0000) Controlling
"PT" (0×0001) Participating
Default value "CT" (Controlling)

Early Media Buffer Size
PropertyID: embuf, (0×0003)
Description: This property indicates the maximum buffer size for an early media call.
Type: Integer
Characteristics: Read
Defined in: TerminationState descriptor
Possible values:
The early media buffer size property can be any value between 0 and 500 seconds.
Default value is 0 seconds (late media).
Value of 0 implicitly indicates a late media call.

Call Initiator SIP URI
PropertyID: sipuri, (0×0004)
Description: The value of the sipuri property is the SIP URI of the initiating UE corresponding to the termination, which is sent as the talker identity in the CNAME of FLOOR TAKEN RTCP APP message, when the floor is granted implicitly to the inviting UE.
Type: String
Characteristics: Read
Defined in: TerminationState descriptor
Possible values: SIP URI of the UE corresponding to this termination Floor control mechanism
PropertyID: fcm, (0×0004)
Description: This property states the floor control mechanism to be used for the termination.
Type: Enumeration
Characteristics: Read
Defined in: TerminationState descriptor
Possible values: The floor control mechanism property may be specified as:
"POC1" (0×0000) POC Consortium POC1
"POC2" (0×0001) POC Consortium POC1
"omap1" (0×0002) OMA POC1
Default value "omap1" (OMA POC1)

2. Events

POC Inactivity Timeout
EventID: pito, (0×000)
Description: Detects that POC inactivity timer has expired. MRFP shall send a NOTIFY to the MRFC when the inactivity timeout occurs, and NO UE has sent any RTP packets for the duration of the Maximum Inactivity Time.
EventsDescriptor parameters:
Parameter Name: Maximum Inactivity Time
Parameter ID: mit (0×000)
Type: integer (seconds)
Possible values: 0 to 65535 (0 seconds to 65535 seconds)
Default value may be 55 seconds
Description: Allows the inactivity timer to be configured by MRFC/MGC
ObservedEventsDescriptor parameters: None Floor State
EventID: fstate, (0×0002)
Description: Detects that the floor state transition between idle and taken. MRFC uses this notification to buffer SIP notifications. MRFP shall send a NOTIFY with the floor state at the end of every talk burst.
EventsDescriptor parameters: None
ObservedEventsDescriptor parameters:
Parameter Name: Floor taken
ParameterID: ft(0×0002)
Type: Boolean
Possible values:
0 if no floor owner (Floor Idle)
1 if floor is taken (Floor Taken)
Description: Floor state Explicit Loss Notification
EventID: eln, (0×0003)

Detects packet loss greater than threshold after RTCP RR and SR analysis. Threshold is configurable using the events descriptor. This is used for user plane adaptation. A NOTIFY shall be sent from the MRFP to the MRFC when a loss greater than or equal to the threshold value is detected. This is used for quality feedback.
EventsDescriptor parameters:
Parameter Name: Threshold
ParameterID: thres (0x0001)
Type: Integer
Possible values: 0 to 65536
ObservedEventsDescriptor parameters:
Parameter Name: Percentage Loss
ParameterID: ploss (0x0001)
Type: Integer
Possible values: Percentage loss detected
Description: Used for user plane adaptation. MRFP shall maintain count of actual number of RTP packets sent and received on every termination. MRFP shall use the packet counts received from the RTCP Receiver Reports to compare the actual number of packets sent to the UE with the actual number of packets received by the UE. The actual number of packets received by the UE shall be obtained from the Receiver Report. When the difference between the number of packets sent to the UE and the actual number of packets received by the UE is greater then the percentage loss, then a NOTIFY shall be sent to the MRFC. MRFC may then choose to invoke user plane adaptation procedures.
Talk Burst Parameters
EventID: tbp (0x0004)
Description: This event allows the MRFC to specify all the talk burst related parameters that shall be sent in the NOTIFY at the end of every talk burst. The MRFC shall specify the parameters that shall be sent to it by the MRFP at the end of the talk burst in the observed events descriptor of the NOTIFY. The NOTIFY shall be sent at the end of every talk burst if this event is active.
EventsDescriptor parameters:
Parameter Name: Talk Burst Length
ParameterID: tbl (0x0001)
Type: Boolean
Possible values:
i. 0 if Talk burst length shall NOT be sent in NOTIFY
ii 1 if Talk burst length shall be sent in NOTIFY
iii. Default value is 0
Description: Allows the MRFC to instruct the MRFP to send talk burst length to the MRFC at the end of every talk burst.
Parameter Name: RTP packets received
ParameterID: pr (0x0002)
Type: Boolean
Possible values:
i. 0 if number of packets received shall NOT be sent in NOTIFY
ii 1 if number of packets received shall be sent in NOTIFY
iii. Default value is 0
Description: Number of packets received in the talk burst on termination corresponding to the UE that was granted the floor. Allows the MRFC to instruct the MRFP to send the number of packets received to the MRFC at the end of every talk burst.
Parameter Name: Floor state
ParameterID: fstate (0x0003)
Type: Boolean
Possible values:
i. 0 if floor state shall NOT be sent in NOTIFY at the end of talk burst.
ii. 1 if floor state shall be sent in NOTIFY at the end of talk burst.
iii. Default value is 0
Description: Allows the MRFC to instruct the MRFP to send to the MRFC the floor state information at the end of talk burst.
Parameter Name: Talk Burst Start time
ParameterID: tbst (0x0004)
Type: Boolean
Possible values:
i. 0 if Talk burst start time shall NOT be sent in NOTIFY at the end of talk burst.
ii. 1 if Talk burst start time shall be sent in NOTIFY at the end of talk burst.
iii. Default value is 0
Description: Allows the MRFC to instruct the MRFP to send to the MRFC the Talk burst start time information at the end of talk burst.
Parameter Name: Talk Burst End time
ParameterID: tbet (0x0005)
Type: Boolean
Possible values:
i. 0 if Talk burst end time shall NOT be sent in NOTIFY at the end of talk burst.
ii. 1 if Talk burst end time shall be sent in NOTIFY at the end of talk burst.
iii. Default value is 0
Description: Allows the MRFC to instruct the MRFP to send to the MRFC the Talk burst end time information at the end of talk burst.
ObservedEventsDescriptor parameters:
Parameter Name: Length
ParameterID: sec (0x0001)
Type: Integer
Possible values: Length of talk burst in seconds
Description: Length of last talk burst is sent to the MRFC at the end of every talk burst. This may be used for prepaid charging. This shall be sent in the NOTIFY only when the Events Descriptor has the tbl property set to 1.
Parameter Name: RTP packets received
ParameterID: pr (0x0002)
Type: Double
Possible values: any 64 bit integer
Description: Number of packets received in talk burst. This shall be sent only when the Events Descriptor has the pr property set to 1.
Parameter Name: Floor state
ParameterID: fstate (0x0003)
Type: Boolean
Possible values:
i. 0 if floor state is IDLE
ii. 1 floor is TAKEN
iii. Default value is 0
Description: Allows the MRFC to instruct the MRFP to send to the MRFC the floor state information at the end of talk burst. This allows the MRFP to send to the MRFP the floor state information along with the charging information at the end of talk burst, thereby saving one transaction, since a two NOTIFY transactions would have been necessary for the floor state, and the charging information respectively, if this information was not combined in the same NOTIFY as stated above.
Parameter Name: Talk Burst Start time
ParameterID: tbst (0x0004)

Type: Double
Possible values: Time stamp when first RTP packet was received in a talk burst
Description: Allows the MRFC to instruct the MRFP to send to the MRFC the Talk burst start time information at the end of talk burst. This may be used for time based pre-paid charging.
Parameter Name: Talk Burst End time
ParameterID: tbet (0x0005)
Type: Double
Possible values: Time stamp when last RTP packet was received in a talk burst
Description: Allows the MRFC to instruct the MRFP to send to the MRFC the Talk burst end time information at the end of talk burst. This may be used for time based pre-paid charging.
Restricted Termination Event
EventID: restr, (0x0005)
Description: When a termination is restricted because the UE corresponding to the restricted termination continued to send media beyond the allowed time, a NOTIFY is sent to the MRFC. Another NOTIFY is sent when the termination's restricted status is removed. MRFC shall NOT invoke charging procedures for pre-paid charging on a restricted termination, if the restriction is on sending media to the termination, since the UE corresponding to the restricted termination did not get any media from the active sender that had the floor.
EventsDescriptor parameters: None
ObservedEventsDescriptor parameters:
Parameter Name: Restricted User state
ParameterID: rstate (0x0002)
Type: Boolean
Possible Values: 0: if user is NOT restricted
  1: if user is restricted
  Default value: 0
Parameter Name: Restriction Type
ParameterID: rtype (0x0002)
Type: Enumeration
Possible values:
i. "SO" (0x0000) Send Only
ii. "RO" (0x000) Receive only
iii. "IN" (0x0002) Inactive
iv. "NO" (0x0003) No Restriction
v. Default value "NO"
Description: MRFP may set the type of restriction on a particular POC session participant based on some local policy.
3. Statistics
Statistic Name: Number of Talk Bursts
Statistic ID: ntb (0x000)
Type: Double
Possible values: 64 bit integer
Description: Total number of talk bursts received on the termination for the duration of the POC Session. This may be used for charging.
Statistic Name: Talk Bursts Received Duration
Statistic ID: tbrd (0x0002)
Type: Double
Possible values: 64 bit integer
Description: Cumulative duration (in seconds) of ALL talk bursts received on the termination for the duration of the POC Session. This may be used for charging.

D. H.248.1 (v3) Requirements and Anticipated Extensions
1. Properties defined in H.248 contexts
H.248 version 3 defines the "Context Attribute Descriptor", which is used to specify properties (defined in packages) that apply to the context as a whole (see Section 7.1.1.9). Some of the properties defined in the inventive POC package are properties of the context. However, H.248.1 Version 1 does not have support for defining properties of a context using new packages. The context properties are defined in the termination state descriptor of all the terminations in the context, and they should be synchronized (that is, maintain the same parameter values) for all terminations. Listed below are the properties that should be defined as context properties, rather than in the termination state descriptor:
  a) POC Version (sPOC/POCver)
  b) Floor Control Mechanism (sPOC/FCM)
2. Events in H.248 contexts (Proposed Extension)
H.248 currently does not define events on a H.248 context. However, there are some events that indicate notifications related to the entire context, and they are not related to any particular termination on a context. The following events defined in the POC package are candidates for events defined on H.248 contexts:
  a) POC Inactivity Timeout event (pito): A Notify is sent to the MRFC when an inactivity timer fires. This happens when there are no RTP or RTCP messages on any of the termination streams in a context.
  Floor State Event (fstate): This event generates a NOTIFY when the floor state changes from IDLE to BUSY or BUSY to IDLE. The floor state is the property of a context, and intuitively, does not belong to a particular termination.
E. Conclusion
Advantages of the invention include an efficient technique for providing push-to-talk communications.
Having disclosed exemplary embodiments and the best mode, modifications and variations may be made to the disclosed embodiments while remaining within the subject and spirit of the invention as defined by the following claims.

The invention claimed is:
1. An apparatus for performing push-to-talk communications over a wireless network, comprising:
  a push-to-talk (PTT) server including an application server and a media resource function processor (MRFP), the PTT server configured to communicate with user equipment over a wireless link, wherein
  the application server includes a media resource function controller (MRFC) for interpreting a plurality of requests from the application server and for controlling a plurality of media streams in the MRFP, wherein
  the MRFP is allocated by the MRFC to provide on-going floor control in a push-to-talk session, and wherein
  the MRFP controls the floor state independent of the MRFC.
2. The apparatus of claim 1, further comprising:
  a plurality of handsets, each handset capable of communicating with a PTT server and each handset including a floor request switch configured to selectively generate a floor request signal; and
  wherein the MFRP is configured to receive a floor request signal and to selectively grant floor control to a requesting user.

3. The apparatus of claim 1, wherein:
the PTT server includes a plurality of MRFPs each configured to provide floor control in a push-to-talk session.

4. The apparatus of claim 1, wherein:
the MRFC is configured to communicate call configuration setup to the MRFP, and the MRFP is configured to perform floor control independently until the call is terminated by the MRFC.

5. A method for performing push-to-talk (PTT) communications over a wireless network, using a PTT server, the PTT server including an application server (AS) having a media resource function controller (MRFC), and a media resource function processor (MRFP), the PTT server configured to communicate with user equipment over a wireless link, comprising the steps of:
communicating between the MRFP and the MRFC, wherein the communicating includes,
activating a floor control mechanism by the MRFC, and
allocating the floor control mechanism to the MRFP by the MRFC such that the
MRFC is no longer capable of controlling a floor state;
receiving a floor request from a user equipment in the MRFP; and
determining whether to grant the floor request to the user equipment by the MRFP.

6. The method of claim 5, wherein the communicating step includes using H.248 protocol.

7. The method of claim 5, wherein the communicating step includes,
communicating call configuration setup by the MRFC to the MRFP and call teardown at the end of the PTT session.

8. The method of claim 5, wherein the communicating step includes,
the MRFC subscribing to the MRFP specifying Talk Burst parameters that are included in subsequent notifications, and
the MRFP sending a NOTIFY message to the MRFC after having changed the floor state.

9. The method of claim 8, wherein:
the NOTIFY message contains the floor state.

10. The method of claim 8, wherein: the NOTIFY message contains Talk Burst Length.

11. The method of claim 8, wherein:
the NOTIFY message contains Talk Burst Start Time.

12. The method of claim 8, wherein:
the NOTIFY message contains Talk Burst End Time.

13. The method of claim 8, wherein:
the notification contains RTP Packets Received.

14. The method of claim 8, wherein:
the NOTIFY message contains the Identities of sending and receiving user equipment.

15. The method of claim 5, wherein the user equipment includes a sending handset, and wherein the communicating step includes the MRFP sending a Restricted Termination Event to the MRFC when the sending handset continues to send media beyond an allowed time.

16. The method of claim 15, wherein:
the Restricted Termination Event contains Restricted User State.

17. The method of claim 15, wherein:
the Restricted Termination Event contains Restriction Type.

18. The method of claim 15, wherein:
the Restricted Termination Event contains Number of Talk Bursts.

19. The method of claim 15, wherein:
the Restricted Termination Event contains Talk Bursts Received Duration.

20. The method of claim 5, wherein the communicating step includes communication during call setup and teardown, but not during the call.

* * * * *